United States Patent
Lai

(10) Patent No.: US 11,500,482 B2
(45) Date of Patent: Nov. 15, 2022

(54) MOUSE PAD STRUCTURE

(71) Applicant: E-CENTURY TECHNICAL & INDUSTRIAL CORPORATION, New Taipei (TW)

(72) Inventor: I-Kuang Lai, New Taipei (TW)

(73) Assignee: E-CENTURY TECHNICAL & INDUSTRIAL CORPORATION, New Taipei (TW)

( * ) Notice: Subject to any disclaimer, the term of this patent is extended or adjusted under 35 U.S.C. 154(b) by 121 days.

(21) Appl. No.: 17/213,183

(22) Filed: Mar. 25, 2021

(65) Prior Publication Data
US 2022/0129090 A1    Apr. 28, 2022

(30) Foreign Application Priority Data
Oct. 23, 2020   (TW) ................. 109214026

(51) Int. Cl.
G06F 3/039    (2013.01)
B01D 69/02    (2006.01)
C08K 7/20    (2006.01)

(52) U.S. Cl.
CPC ........... *G06F 3/0395* (2013.01); *B01D 69/02* (2013.01); *C08K 7/20* (2013.01)

(58) Field of Classification Search
None
See application file for complete search history.

(56) References Cited

U.S. PATENT DOCUMENTS

| | | | | |
|---|---|---|---|---|
| 8,044,942 B1 * | 10/2011 | Leonhard | ............... | G06F 3/0393 345/173 |
| 2012/0068967 A1 * | 3/2012 | Toubiana | .............. | G06F 3/0446 2/167 |
| 2017/0038842 A1 * | 2/2017 | Yairi | ..................... | G06F 3/0393 |

* cited by examiner

*Primary Examiner* — Nicholas J Lee
(74) *Attorney, Agent, or Firm* — Chun-Ming Shih; HDLS IPR Services

(57) ABSTRACT

A mouse pad structure (10) includes a pad (1) and an oleophobic film (2), and the pad (1) has an upper surface (11), and the oleophobic film (11) is adhered to the upper surface (11). The oleophobic film (11) includes a plastic substrate (21) and multiple glass microbeads (22) scattered in the plastic substrate (21), so that the mouse pad structure (10) may have a smooth surface and the effects of resisting oil stains and fingerprints and enhancing the aesthetic appearance of a mouse pad.

10 Claims, 3 Drawing Sheets

MOUSE PAD STRUCTURE

BACKGROUND OF THE INVENTION

Technical Field

The technical field of this disclosure relates to a mouse pad placed under a mouse, and more particularly to a mouse pad structure.

Description of Related Art

Mouse pad is usually used to assist the users during operating a mouse, the users may move a cursor on a screen and sense a cursor displacement accurately. Thus, an appropriate mouse pad is important for smooth operation.

Generally, when the surface of the mouse pad is smoother, the cursor of the mouse may move more smoothly. Nowadays the pursuing of the uniqueness of product design is increased Thus, how to produce a mouse pad with a smooth surface and a unique appearance is one of the main subjects for research and development in the industry.

Therefore, the inventor of this disclosure conducts extensive research and experiment based on the experiences in the related industry, and provides a feasible solution to overcome the aforementioned problem.

SUMMARY OF THE INVENTION

This disclosure is directed to a mouse pad structure that uses an oleophobic film having a plastic substrate and a plurality of glass microbeads scattered in the plastic substrate to achieve the functions of the mouse pad structure having a smooth surface, the oil stains and fingerprints resistance, and the aesthetic enhancement.

In an embodiment of this disclosure, the mouse pad structure includes: a pad having an upper surface; and an oleophobic film attached on the upper surface and having a plastic substrate and a plurality of glass microbeads scattered in the plastic substrate.

Based on the above description, when the upper surface of a pad is not smooth enough, the pad may not be appropriate for a mouse to use. In this disclosure, the oleophobic film is adhered to the upper surface of the pad to make an upper surface of the pad smooth and resist to oil stains and fingerprints, so that the mouse may move on the pad smoothly to achieve the functions of the mouse pad structure having a smooth surface, and oil stain and fingerprint resistance.

Based on the above description, the oleophobic film includes a plastic substrate and a plurality of glass microbeads scattered in the plastic substrate. The glass microbeads reflect the light and shine when they are exposed to the light, so as to enhance the aesthetic appearance of the mouse pad structure.

DETAILED DESCRIPTION OF THE EMBODIMENTS

The technical contents of this disclosure will become clear with the detailed description of embodiments accompanied with the illustration of related drawings as follows. It is intended that the embodiments and drawings disclosed herein are to be considered illustrative rather than restrictive.

Figure 1:
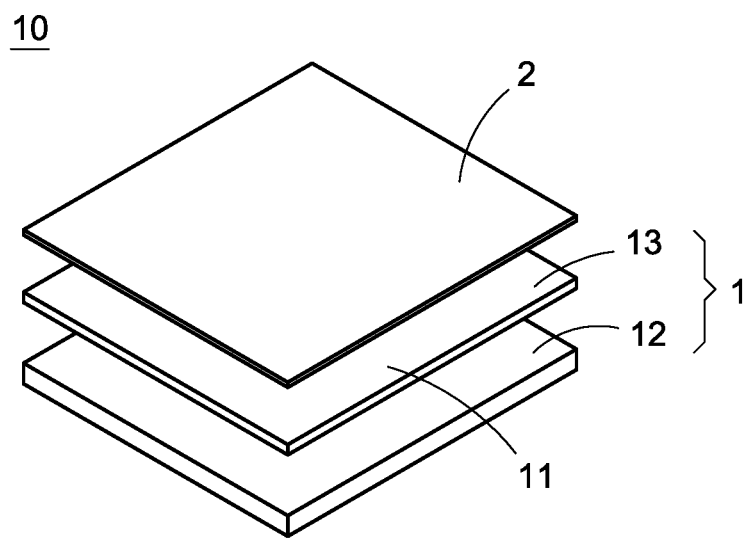
FIG. 1 is an exploded view of a mouse pad structure of this disclosure.
Figure 2:
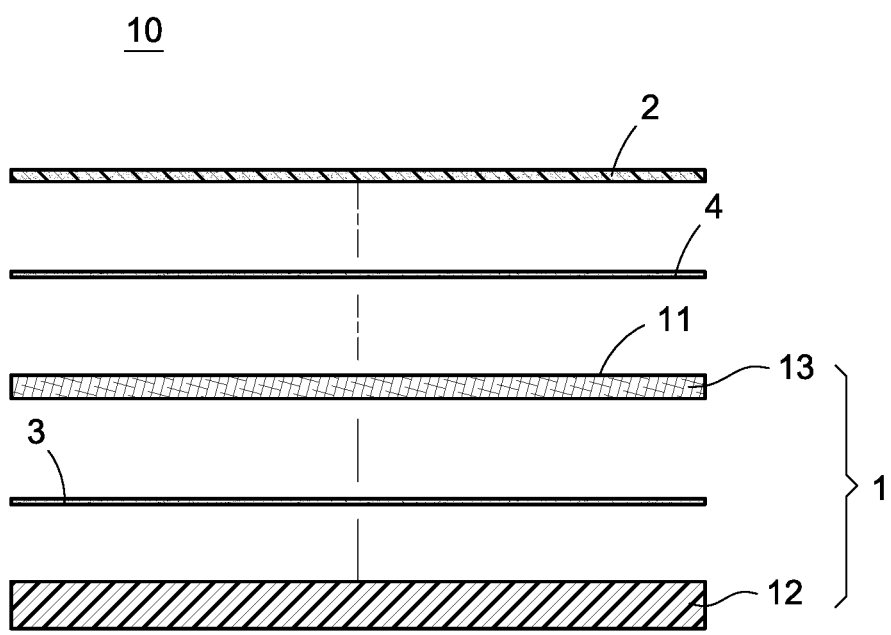
FIG. 2 is another exploded view of a mouse pad structure of this disclosure.
Figure 3:
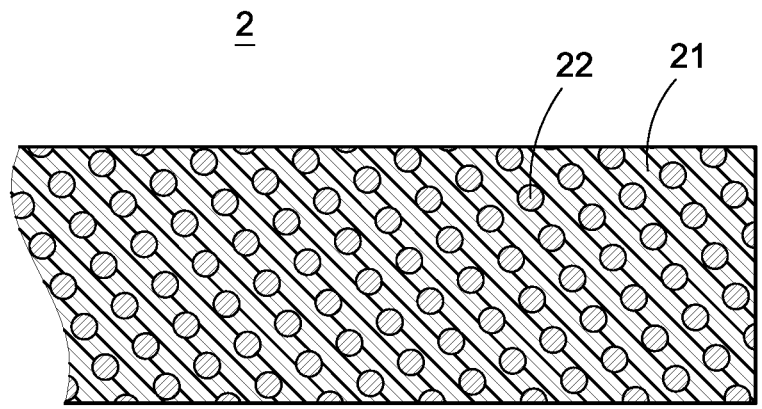
FIG. 3 is a cross-sectional view of an oleophobic film of this disclosure.

With reference to FIGS. 1 to 3 for a mouse pad structure of this disclosure, the mouse pad structure 10 includes a pad 1 and an oleophobic film 2.

In FIGS. 1 and 2, the pad 1 has an upper surface 11 described in details below. The pad 1 includes an elastic pad body 12 and a fabric layer 13, and the fabric layer 13 is stacked above the elastic pad body 12, and the upper surface 11 is formed above of the fabric layer 13, and the elastic pad body 12 is made of a silicone or rubber material, and the fabric layer 13 is made of a fabric which is produced by weaving, plain weaving or knitting.

In FIGS. 1 to 3, the oleophobic film 2 is attached on the upper surface 11, and the oleophobic film 2 includes a plastic substrate 21 and a plurality of glass microbeads 22 scattered in the plastic substrate 21.

Further, the plastic substrate 21 is made of polyethylene terephthalate (PET), polyurethane (PU) or thermoplastic polyurethanes (TPU), and the glass microbead 22 is made of glass, and each glass microbead 22 has a diameter equal to or greater than 10 microns and equal to or less than 30 microns.

In addition, a weight of the plastic substrate 21 is equal to or greater than 45% and equal to or less than 60% of the total weight of the oleophobic film 2, and a weight of the plurality of glass microbeads 22 is equal to or greater than 40% and equal to or less than 55% of the total weight of the oleophobic film 2.

In FIG. 2, the mouse pad structure 10 of this disclosure further includes a first adhesive layer 3 and a second adhesive layer 4, and the first adhesive layer 3 is sandwiched between the elastic pad body 12 and the fabric layer 13, and the fabric layer 13 is adhered above the elastic pad body 12, and the second adhesive layer 4 is sandwiched between the upper surface 11 and the oleophobic film 2, and the oleophobic film 2 is adhered above the pad 1.

With reference to FIGS. 1 to 3 for the using status of the mouse pad structure 10 of this disclosure, the fabric layer 13 is produced by weaving, plain weaving or knitting and the upper surface 11 of the pad 1 may be unsmooth for a mouse to use, so that the oleophobic film 2 is adhered to the upper surface 11 of the pad 1. As a result, the upper surface of the pad 1 may become smooth and resist oil stains and fingerprints for the mouse to move on the pad 1 smoothly, so as to achieve the effects of the mouse pad structure 10 having a smooth surface, and oil stains and fingerprints resistance.

In addition, the oleophobic film 2 includes a plastic substrate 21 and a plurality of glass microbeads 22 scattered in the plastic substrate 21, and the glass microbeads 22 reflect the light and shine when they are exposed to the light, so as to improve the aesthetic appearance of the mouse pad structure 10.

Figure 4:
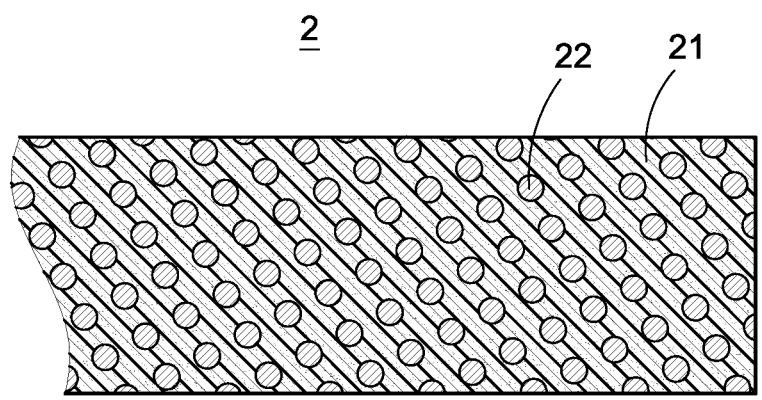
FIG. 4 is another cross-sectional view of an oleophobic film of this disclosure.

With reference to FIG. 4 for another embodiment of the oleophobic film 2 of this disclosure, this embodiment as shown in FIG. 4 is substantially the same as the previous embodiment as shown in FIGS. 1 to 3, and their difference resides on that the oleophobic film 2 of this embodiment further includes a plurality of glitter powders.

Specifically, the plurality of glitter powders is scattered in the plastic substrate 21, and a weight of the plurality of glass microbeads 22 and the plurality of glitter powders is equal to or greater than 40% and equal to or less than 55% of the total weight of the oleophobic film 2, and the glitter powders have different colors, so that the glitter powders reflect the light when they are exposed to the light. The aesthetic appearance of the mouse pad structure 10 may be further enhanced.

Figure 5:
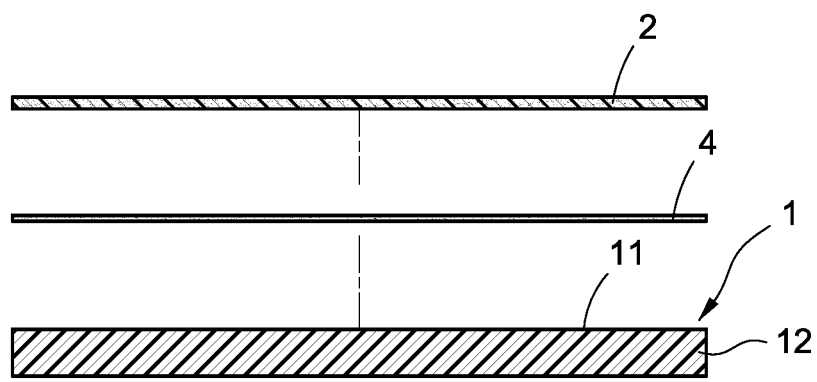
FIG. 5 is an exploded view of a mouse pad structure in accordance with another embodiment of this disclosure.

With reference to FIG. 5 for another embodiment of the mouse pad structure 10 of this disclosure, the embodiment as shown in FIG. 5 is substantially the same as the previous embodiment as shown in FIGS. 1 to 3, and their difference resides on that the pad 1 of this embodiment is an elastic pad body 12.

The pad 1 of embodiment is solely the elastic pad body 12, and the upper surface 11 is formed above the elastic pad body 12. Although the pad 1 does not include the fabric layer, the elastic pad body 12 is made of silicone or rubber, so that the surface of the elastic pad body 12 is not smooth. In this disclosure, the oleophobic film 2 is adhered on the upper surface 11 of the pad 1, so that the upper surface of the pad 1 may become smooth and resist oil stains and fingerprints. Therefore, this embodiment may also achieve the same effect of the previous embodiment as shown in FIGS. 1 to 3.

While this disclosure has been described by means of specific embodiments, numerous modifications and variations could be made thereto by those skilled in the art without departing from the scope and spirit of this disclosure set forth in the claims.

What is claimed is:

1. A mouse pad structure, comprising:
a pad (1), comprising an upper surface (11); and
an oleophobic film (2), adhered to the upper surface (11), and comprising a plastic substrate (21) and a plurality of glass microbeads (22) scattered in the plastic substrate (21).

2. The mouse pad structure in claim 1, wherein a weight of the plurality of glass microbeads (22) is equal to or greater than 40% and equal to or less than 55% of a total weight of the oleophobic film (2).

3. The mouse pad structure in claim 1, wherein the oleophobic film (2) further comprises a plurality of glitter powders scattered in the plastic substrate (21).

4. The mouse pad structure in claim 3, wherein a weight of the plurality of glass microbeads (22) and the plurality of glitter powders is equal to or greater than 40% and equal to or less than 55% of a total weight of the oleophobic film (2).

5. The mouse pad structure in claim 1, wherein a weight of the plastic substrate (21) is equal to or greater than 45% and equal to or less than 60% of the total weight of the oleophobic film (2).

6. The mouse pad structure in claim 1, wherein the plastic substrate (21) comprises polyethylene terephthalate (PET), polyurethane (PU) or thermoplastic polyurethanes (TPU), and a diameter of each glass microbead (22) is equal to or greater than 10 microns and equal to or less than 30 microns.

7. The mouse pad structure in claim 1, wherein the pad (1) comprises an elastic pad body (12), and the upper surface (11) is disposed above the elastic pad body (12), and the elastic pad body (12) comprises silicone or rubber.

8. The mouse pad structure in claim 1, wherein the pad (1) comprises an elastic pad body (12) and a fabric layer (13), and the fabric layer (13) is stacked above the elastic pad body (12), and the upper surface (11) is disposed above the fabric layer (13), and the elastic pad body (12) comprises silicone or rubber.

9. The mouse pad structure in claim 8, further comprising: a first adhesive layer (3) sandwiched between the elastic pad body (12) and the fabric layer (13).

10. The mouse pad structure in claim 1, further comprising: a second adhesive (4) sandwiched between the upper surface (11) and the oleophobic film (2).

* * * * *